United States Patent [19]

Hrebec

[11] 4,217,723
[45] Aug. 19, 1980

[54] FLY CATCHER

[76] Inventor: Frank Hrebec, 25287 Lehnep, Roseville, Mich. 48066

[21] Appl. No.: 959,252

[22] Filed: Nov. 9, 1978

[51] Int. Cl.² .............................................. A01M 1/02
[52] U.S. Cl. ...................................................... 43/122
[58] Field of Search ........................ 43/107, 120, 122; 215/307; 43/118

[56] References Cited

U.S. PATENT DOCUMENTS

| 117,489 | 7/1871 | Victor . | |
| 118,852 | 9/1871 | Grim . | |
| 439,545 | 10/1890 | McKee | 43/122 |
| 722,143 | 3/1903 | Raymond | 43/122 |
| 882,306 | 3/1908 | Fredrickson | 43/122 |
| 1,042,390 | 10/1912 | Brelle | 215/307 X |
| 1,786,704 | 12/1930 | Deibele | 43/122 |
| 2,436,291 | 2/1948 | Daniel | 215/307 X |
| 3,318,496 | 5/1967 | Ayotte et al. | 215/307 X |
| 3,339,772 | 9/1967 | Miller | 215/307 X |
| 3,820,273 | 6/1974 | Novak | 43/122 X |

FOREIGN PATENT DOCUMENTS 33531 12/1931 Australia ..................................... 43/107

Primary Examiner—Gary L. Smith
Assistant Examiner—Robert P. Olszewski
Attorney, Agent, or Firm—Basile, Weintraub and Hanlon

[57] ABSTRACT

A trap for catching flies having a cylindrical glass outer shell with a closed top and an open bottom is disclosed. An opaque truncated cone having a thin shell and an open top is disposed within the cylindrical outer shell. The space between the outer shell and the truncated cone is filled with water to trap and drown the flies that enter the trap. A piece of bait is suspended on a wire near the upper opening of the cone to attract insects into the trap. The glass outer shell of the fly catcher provides an abundance of light to attract the insects into the cone and through the upper opening of the cone and trap them. A loop attached to the closed top is provided to hang the fly catcher from an overhead support. The fly catcher can be readily disassembled to be cleaned and to remove trapped insects.

3 Claims, 1 Drawing Figure

FLY CATCHER

BACKGROUND OF THE INVENTION

I. Field of the Invention

The present invention relates to the field of fly catchers and in particular to the field of fly catching traps having an inner truncated cone with a thin shell open at the bottom and the top. The top cone is surrounded by a outer cylindrical glass shell with a closed top. Water is contained in the space between the cone and the shell.

II. Prior Art Statement

U.S. Pat. No. 117,489 and U.S. Pat. No. 118,852 disclose a fly trap having an inner cone surrounded by a outer container with water contained in the space between the inner cone and the outer container. Both of the above cited patents disclose a fly trap that is supported in use on a flat horizontal surface and have a plurality of openings around the bottom edge of the trap to attract the flies to enter the cone. None of the above patents disclose a fly trap for catching flies having an outer container cylindrical in shape made entirely of glass with a closed top which can be disassembled for cleaning. The above referenced patents also do not disclose a means for suspending the fly catcher from an overhead support. The above listed U.S. Patents constitute the entire art of which the applicant is aware.

SUMMARY OF THE INVENTION

The present invention comprises a fly catcher having a cylindrical glass outer shell and a closed top. A flange having a flat bottom and a loop at the top integral therewith is bonded to the closed top at its outer surface. The loop serves as a means for suspending the fly catcher from an overhead support. An open bottom of the cylindrical glass outer shell snugly receives the bottom diameter of the truncated hollow cone. The cone is made of plastic or other suitable opaque material. The truncated cone bottom diameter extends up from the bottom a distance to define a short cylindrical portion thereof. An outer diameter extends radially outward from the bottom diameter to provide a flange which abuts the bottom of the outer shell when the cone is installed. A groove around the periphery of the cylindrical portion is spaced up from the bottom a distance. The groove is configured to receive an elastic ring so that when the truncated cone is inserted into the inside diameter of the outer shell the elastic ring is squeezed between the bottom of the groove and the inside diameter of the outer shell forming a seal. The outside diameter of the outer shell is threaded at the bottom, the threads extending a distance up the side of the outer shell. A bottom retainer is threaded to threadingly receive the bottom threads of the outer shell. The bottom retainer has a bottom wall extending radially inward a distance terminating in a bottom opening which has an inside diameter approximately equal to the inside diameter of the cone.

The space between the outer shell and the cone is filled with water to trap and drown flies which enter the cone. The truncated cone extends upward into the outer shell toward the closed top terminating a distance short of the closed top. A horizontal line on the outer surface of the cylindrical glass outer shell defines the level to which the water should be established to achieve optimum results.

A wire bait hanger has its upper end bent in the shape of a hook over the top edge of the cone which serves as a support for the hanger. A notch is spaced down from the upper end of the wire bait hanger a distance which forms a support where a piece of bait is attached to attract flies. A lower end of the wire bait hanger extends below the bottom edge of the trap to allow the wire bait hanger to be easily installed.

Other objects, advantages, and applications of the present invention will become apparent to those skilled in the art of fly catchers when the accompanying description of one example of the best mode contemplated for practicing the invention is read in conjunction with the accompanying drawings.

BRIEF DESCRIPTION OF THE DRAWING

The description herein makes reference to the accompanying drawing wherein like reference numbers refer to like parts throughout the several views and wherein.

DESCRIPTION OF THE PREFERRED EMBODIMENT

Figure 1:
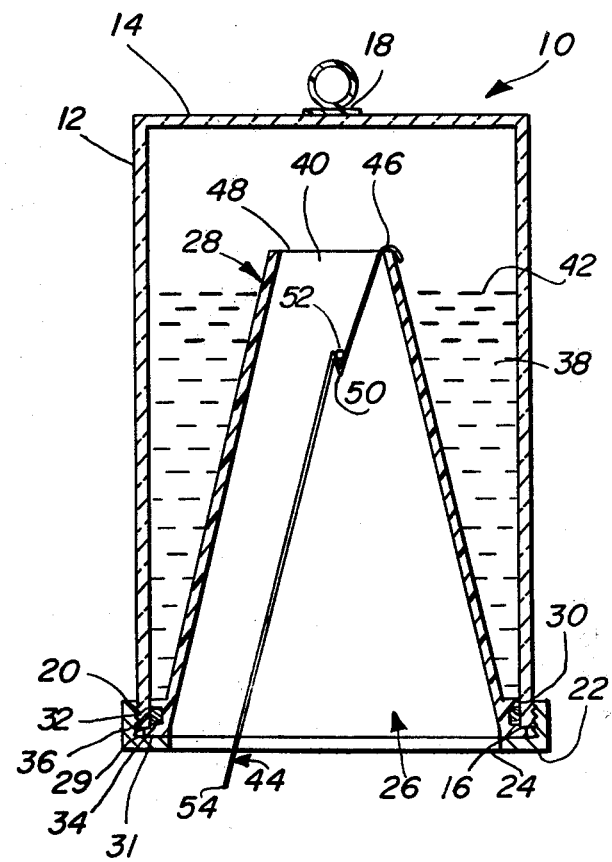
FIG. 1 illustrates the only figure associated with the preferred embodiment of the present invention.

Referring now to the drawing wherein at FIG. 1 the preferred embodiment of the present invention is illustrated at 10. The fly catcher comprises a cylindrical glass outer shell 12 having a closed top 14 and an open bottom 16. A flat bottom flange 18 has a loop projecting from its top and the flange 18 is securely bonded to the outer surface of the closed top 14 to provide a means for suspending the fly catcher from an overhead support. The cylindrical glass outer shell 12 has a threaded portion 20 extending up from the bottom a distance along the outer surface to threadingly receive the threads of a bottom retainer 22. A bottom wall 24 of the flange extends radially inward a distance terminating to define a bottom retainer opening 26.

A truncated hollow cone 28 has a bottom diameter 30 configured to snugy engage the open bottom 16 of the cylindrical glass outer shell 12. An outer diameter 29 extends radially outward from the bottom diameter 30 a distance forming a flange 31 which abuts the bottom of the shell 12. The truncated cone bottom diameter 30 extends vertically upward a distance to define a short cylindrical portion 32. Spaced up a distance from the bottom of the cone is a groove 34 around the periphery of the short cylindrical portion. An elastic ring 36 is configured to fit into the groove 34 and when the cone 28 is inserted into the cylindrical glass outer shell 12 the elastic ring 36 is squeezed between the bottom of the groove 34 and the inside diameter 16 of the outer shell 12 forming a seal. When the cone 28 has been inserted into the outer shell 12 the bottom retainer 22 is threaded onto the threaded portion 20 of the outer shell to securely retain the truncated hollow cone 28 in place.

The space between the cylindrical glass outer shell 12 and the truncated hollow cone 28 is filled with water 38 to trap and drown flies which enter the open top 40 of the cone. The preferred level for the water 38 is about 1½ inches below the top of the cone 40. A horizontal line 42 on the outside surface of a cylindrical glass shell indicates the preferred level for the surface of the water.

A wire bait hanger 44 has a hook 46 formed at its upper end. The hook 46 resting over the top edge 48 of the cone 28 forms a support for the wire bait hanger 44. A notch 50 is formed in the wire bait hanger 44 a distance down from the upper end 46. The notch 50 serves as a support for a piece of bait 52 which attracts flies into the cone 28. The wire bait hanger 44 has a lower end 54 which projects below the bottom wall 24 of the bottom retainer 22 to enable the bait hanger to be easily installed.

Flies are irresistibly attracted by a bright spot at the end of a dark tunnel. This attractive environment is created by the opaque cone terminating in the upper end of a cylindrical glass outer shell having a glass enclosed top. The presence of the water 38 surrounded by the cylindrical glass outer shell 12 further captures and amplifies the available light adding to the attractiveness of the present invention to flies.

I claim:

1. A trap for catching flies comprising:

a cylindrical glass outer shell with a closed top and open bottom, a threaded portion along the outside periphery of the outer shell extending up from the bottom a distance;

a truncated hollow cone with a bottom diameter sized to slidingly fit the inside diameter of the outer shell, the bottom diameter extending up from the bottom a distance, a groove spaced up from the bottom a distance extending around the periphery of the bottom diameter, the groove sized to receive an elastic ring which is squeezed between a bottom of the groove and the inside diameter of the outer shell, the truncated cone terminating at an open top a distance down from the closed top of the outer shell;

a flange having flat bottom and a loop integral therewith bonded to the outer surface of the closed top to provide a means for rotating the trap;

a bottom retainer comprising an outer wall threaded along an inside diameter to threadingly engage the threaded portion of the outer shell, a bottom wall projecting inward a distance, a bottom opening equalling an inside bottom diameter of the hollow cone; and a wire bait hanger having a hook at its upper end to support the hanger at a top edge of the cone, a notch bent in the wire proximate the upper end to support a piece of bait for attracting flies, a lower end of the wire extending below the bottom opening a distance, wherein the bait can be changed without disassembly of the trap.

2. A trap for catching flies as defined in claim 1 further comprising a line along the outside of the outer shell to indicate the preferred water level.

3. A trap for catching flies as defined in claim 1 wherein the truncated hollow cone is made of opaque material.

* * * * *